(12) United States Patent
Oh

(10) Patent No.: US 10,702,070 B2
(45) Date of Patent: Jul. 7, 2020

(54) BED FRAME

(71) Applicant: Grantec (Xiamen) Co., Ltd., Xiamen (CN)

(72) Inventor: Suk Kan Oh, Xiamen (CN)

(73) Assignee: GRANTEC (XIAMEN) CO., LTD., Xiamen, Fujian (CN)

( * ) Notice: Subject to any disclaimer, the term of this patent is extended or adjusted under 35 U.S.C. 154(b) by 292 days.

(21) Appl. No.: 15/673,429

(22) Filed: Aug. 10, 2017

(65) Prior Publication Data

US 2018/0042391 A1 Feb. 15, 2018

(30) Foreign Application Priority Data

Aug. 11, 2016 (CN) .................... 2016 2 0866373 U

(51) Int. Cl.
| | | |
|---|---|---|
| A47C 19/12 | (2006.01) | |
| A47C 19/02 | (2006.01) | |
| A47C 19/00 | (2006.01) | |
| A47C 23/06 | (2006.01) | |
| F16B 12/54 | (2006.01) | |

(52) U.S. Cl.
CPC .......... *A47C 19/122* (2013.01); *A47C 19/005* (2013.01); *A47C 19/027* (2013.01); *A47C 23/062* (2013.01); *F16B 12/54* (2013.01); *A47C 19/025* (2013.01); *A47C 19/126* (2013.01)

(58) Field of Classification Search
CPC ....... A47C 19/00; A47C 19/005; A47C 19/02; A47C 19/021; A47C 19/022; A47C 19/025; A47C 19/027; A47C 19/04; A47C 19/12; A47C 19/122; A47C 19/124; A47C 19/126; A47C 17/64; A47C 17/645; A47C 17/70; A47C 23/06; A47C 23/061; A47C 23/062; A47C 23/068
USPC .......... 5/174, 176.1, 200.1, 201, 202, 282.1, 5/285, 286, 236.1, 238, 111, 114, 116, 5/117
See application file for complete search history.

(56) References Cited

U.S. PATENT DOCUMENTS

| | | | | |
|---|---|---|---|---|
| 273,332 A | * | 3/1883 | Woodin ............... | A47C 23/062 5/238 |
| 277,541 A | * | 5/1883 | Bowers ................ | A47C 23/062 5/238 |
| 372,913 A | * | 11/1887 | Hopkins .............. | A47C 23/062 5/238 |
| 557,997 A | * | 4/1896 | Nessel ................ | A47C 23/062 5/238 |

(Continued)

*Primary Examiner* — Robert G Santos
(74) *Attorney, Agent, or Firm* — Leong C. Lei

(57) ABSTRACT

A bed frame includes a frame, bed legs, and a bed plank support frame. The frame includes two side boards, a head board, and a tail board. Respective bottoms of opposing sides of the two side boards are provided with a plurality of U-shaped connecting members, respectively. The bed plank support frame includes a plurality of support members. Two ends of each support member are connected to U-shaped connecting grooves of the corresponding U-shaped connecting members of the two side boards, respectively. The bed plank support frame is sunk when in use. After a bed plank is placed, there is a certain distance between the bed plank and the top of the frame, so that the frame can form four stop sides. After a mattress is placed on the bed frame, the mattress is restrained in the frame, not sliding.

3 Claims, 7 Drawing Sheets

(56) References Cited

U.S. PATENT DOCUMENTS

| | | | | |
|---|---|---|---|---|
| 687,238 A * | 11/1901 | Johnson | A47C 23/062 | 5/238 |
| 705,384 A * | 7/1902 | Cooper | A47C 23/062 | 5/238 |
| 736,569 A * | 8/1903 | Webb | A47C 23/062 | 5/238 |
| 746,211 A * | 12/1903 | Webb | A47C 23/062 | 5/238 |
| 797,011 A * | 8/1905 | Mosier | A47C 23/062 | 5/238 |
| 984,823 A * | 2/1911 | Linden | A47C 19/022 | 5/279.1 |
| 1,569,728 A * | 1/1926 | Douglas et al. | | 5/116 |
| 1,678,441 A * | 7/1928 | McGrew | A47C 17/68 | 5/112 |
| 1,744,253 A * | 1/1930 | Wedemann | A47C 19/126 | 5/117 |
| 1,833,692 A * | 11/1931 | Silvio | A47C 19/025 | 5/238 |
| 2,391,746 A * | 12/1945 | Schenker | A47C 31/123 | 5/611 |
| 2,492,070 A * | 12/1949 | Stone et al. | A47C 19/025 | 5/238 |
| 2,590,129 A * | 3/1952 | Sawaya | A47C 19/126 | 5/176.1 |
| 2,983,931 A * | 5/1961 | Nelson | F16B 12/54 | 5/238 |
| 3,605,142 A * | 9/1971 | Weinhart | A47C 23/062 | 5/238 |
| 3,613,132 A * | 10/1971 | Weinhart | A47C 23/062 | 5/268 |
| 3,657,748 A * | 4/1972 | Weinhart | A47C 23/062 | 5/238 |
| 3,984,884 A * | 10/1976 | Spitz | A47C 19/005 | 5/176.1 |
| 4,638,517 A * | 1/1987 | Yang | A47C 23/06 | 5/191 |
| 4,745,644 A * | 5/1988 | Pottschmidt | A47C 19/005 | 5/200.1 |
| 6,701,551 B1 * | 3/2004 | Antinori | A47C 23/06 | 5/236.1 |
| 7,003,822 B1 * | 2/2006 | Sheehy | A47C 19/005 | 5/200.1 |
| 8,091,160 B2 * | 1/2012 | Jin | A47C 19/126 | 5/174 |
| 8,707,478 B2 * | 4/2014 | Jin | A47C 19/04 | 5/112 |
| 8,869,324 B1 * | 10/2014 | Lin | A47C 19/02 | 5/200.1 |
| 8,910,327 B2 * | 12/2014 | Jin | A47C 19/126 | 5/174 |
| 9,131,779 B2 * | 9/2015 | Jin | A47C 19/04 | |
| 9,474,385 B2 * | 10/2016 | Oh | A47C 19/126 | |
| 2009/0183311 A1 * | 7/2009 | Nguyen | A47C 19/005 | 5/174 |
| 2010/0235989 A1 * | 9/2010 | Jin | A47C 19/126 | 5/174 |
| 2012/0246826 A1 * | 10/2012 | Jin | A47C 19/04 | 5/400 |
| 2012/0304380 A1 * | 12/2012 | Jin | A47C 19/126 | 5/400 |
| 2014/0298583 A1 * | 10/2014 | Jin | A47C 19/04 | 5/400 |
| 2016/0206112 A1 * | 7/2016 | Oh | A47C 19/126 | |
| 2018/0042391 A1 * | 2/2018 | Oh | A47C 19/027 | |
| 2018/0055235 A1 * | 3/2018 | Choi | A47C 19/005 | |
| 2018/0192778 A1 * | 7/2018 | Choi | A47C 19/027 | |
| 2019/0387888 A1 * | 12/2019 | Choi | A47C 19/027 | |
| 2019/0387889 A1 * | 12/2019 | Choi | A47C 19/027 | |
| 2019/0387890 A1 * | 12/2019 | Choi | A47C 19/027 | |
| 2019/0387891 A1 * | 12/2019 | Choi | A47C 19/027 | |
| 2019/0387892 A1 * | 12/2019 | Choi | F16B 12/56 | |
| 2019/0387893 A1 * | 12/2019 | Choi | A47C 19/027 | |
| 2020/0022501 A1 * | 1/2020 | Choi | A47C 19/12 | |
| 2020/0022502 A1 * | 1/2020 | Choi | A47C 19/122 | |
| 2020/0022503 A1 * | 1/2020 | Choi | A47C 19/12 | |

* cited by examiner

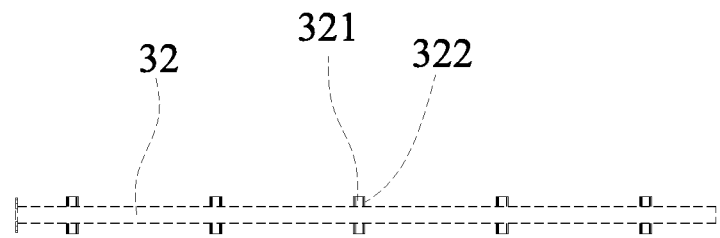
F I G. 6
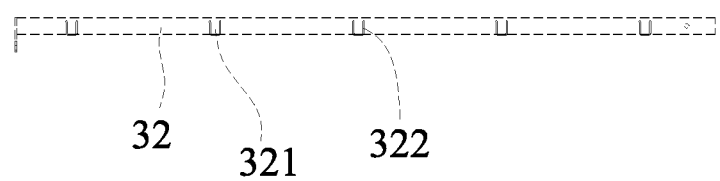
F I G. 7

BED FRAME

BACKGROUND OF THE INVENTION

Field of the Invention

The present invention relates to a bed frame, and more particularly to a bed frame having a bed plank support frame which is able to sink when in use.

Description of the Prior Art

A bed is an indispensable in our daily life. A conventional bed frame comprises a frame, bed legs, a bed plank support frame, and so on. The frame includes two side boards, a head board and a tail board to form a rectangular frame. In general, respective two ends of a plurality of bed plank support rods are inserted to fixing holes of the two side boards of the frame. A bed plank is laid on top of the bed plank support frame. However, after the bed frame is laid with the bed plank, the bed plank is flush with the tops of the side boards of the frame. When a mattress is laid on the bed frame, the mattress is sandwiched by the head board and the tail board to be laid on the bed frame. Because the bed plank is flush with the tops of the side boards of the frame, the mattress may slide left and right when in use.

Another conventional bed frame is an iron bed frame made of iron plates. Opposing sides of two side boards of a frame are integrally formed with support portions to support the bed plank support rods, so that the bed plank support rods are placed on the support portions, and then a bed plank is laid on the bed frame. After the bed frame is laid with the bed plank, the bed plank is flush with the tops of the side boards of the frame. Similarly, the mattress laid on the bed plank may slide.

Accordingly, the inventor of the present invention has devoted himself based on his many years of practical experiences to solve these problems.

SUMMARY OF THE INVENTION

The primary object of the present invention is to provide a bed frame able to prevent a mattress from sliding.

In order to achieve the aforesaid object, the bed frame of the present invention comprises a frame, bed legs, and a bed plank support frame. The bed legs are disposed at a bottom of the frame. The frame includes two side boards, a head board and a tail board to form a rectangular frame. Respective bottoms of opposing sides of the two side boards are provided with a plurality of U-shaped connecting members, respectively. The bed plank support frame includes a plurality of support members. Two ends of each support member are connected to U-shaped connecting grooves of the corresponding U-shaped connecting members of the two side boards, respectively.

Preferably, the bed plank support frame includes the plurality of support members and a support spine. Two ends of the support spine are connected to middle portions of the head board and the tail board, respectively. Two sides of the support spine are provided with a plurality of connecting members each having a slot, respectively. The connecting members of the support spine correspond in position to the U-shaped connecting members of the two side boards, respectively. Each of the support members includes two short struts. One end of each short strut is connected to the U-shaped groove of a corresponding one of the U-shaped connecting members of the side boards, and another end of each short strut is inserted in the slot of a corresponding one of the connecting members of the support spine.

Preferably, the two ends of each short strut each extend downward to form a positioning piece. Timer sides of respective bottoms of the U-shaped connecting members and the connecting members, attached to the side boards and the support spine, are each formed with a recess for the positioning piece to be inserted and positioned.

Preferably, each of the two ends of each short strut is provided with a connecting block. A lower end of the connecting block is longer than the short strut to form the positioning piece. The positioning piece is inserted in the recess to be positioned.

Preferably, each of the side boards, the head board and the tail board includes two short boards connected together by means of a coupling member.

Preferably, upper ends of the two short boards connected to the coupling member abut against each other when unfolded, the upper end of at least one of the two short boards is formed with a cut-out corner which is inclined downward.

Alternatively, the upper ends of the two short boards abut against each other when unfolded. Each of the two short boards is formed with the cut-out corner. The two cut-out corners of the two short boards have a triangular cross section.

Preferably, the U-shaped connecting members are welded to the side boards.

With the above structure, the bed plank support frame of the bed frame of the present invention is sunk when in use. The U-shaped connecting members of the side boards are disposed at the bottoms of the side boards. After a bed plank is placed, there is a certain distance between the bed plank and the tops of the side boards, the head board and the tail board, so that the frame can form four stop sides. After a mattress is placed on the bed frame, the mattress is restrained in the frame, not sliding.

BRIEF DESCRIPTION OF THE DRAWINGS

FIG. 6 is a top view of the support spine of the present invention;

FIG. 7 is a side view of the support spine of the present invention; and

DETAILED DESCRIPTION OF THE PREFERRED EMBODIMENTS

Embodiments of the present invention will now be described, by way of example only, with reference to the accompanying drawings.

Figure 1:
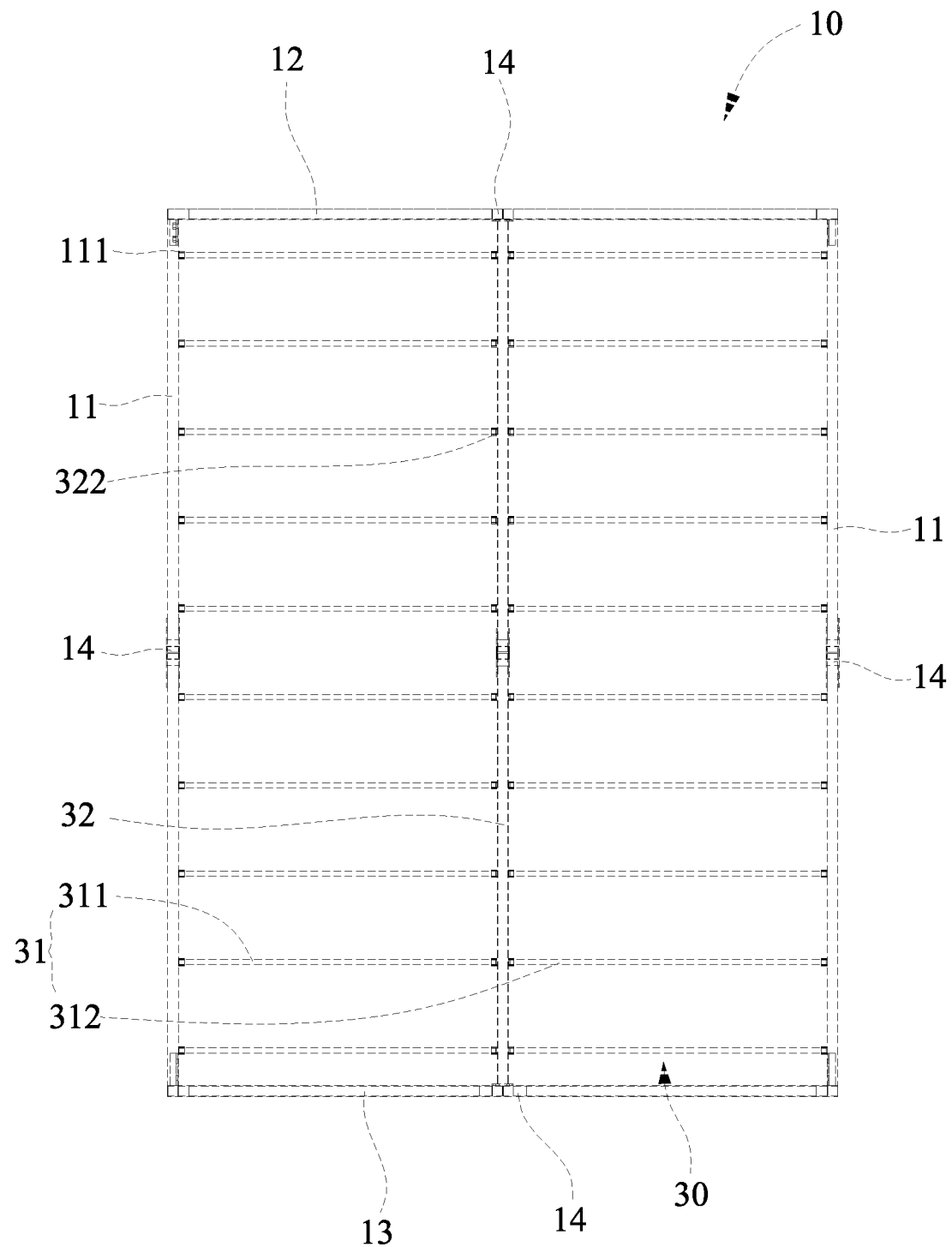
FIG. 1 is a top view of the present invention.
Figure 2:
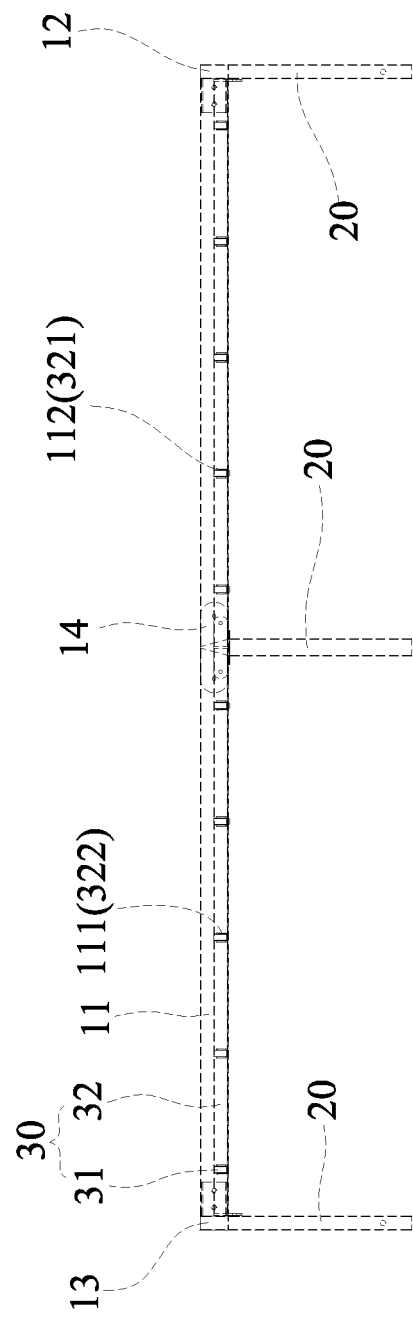
FIG. 2 is a side view of the present invention.
Figure 3:
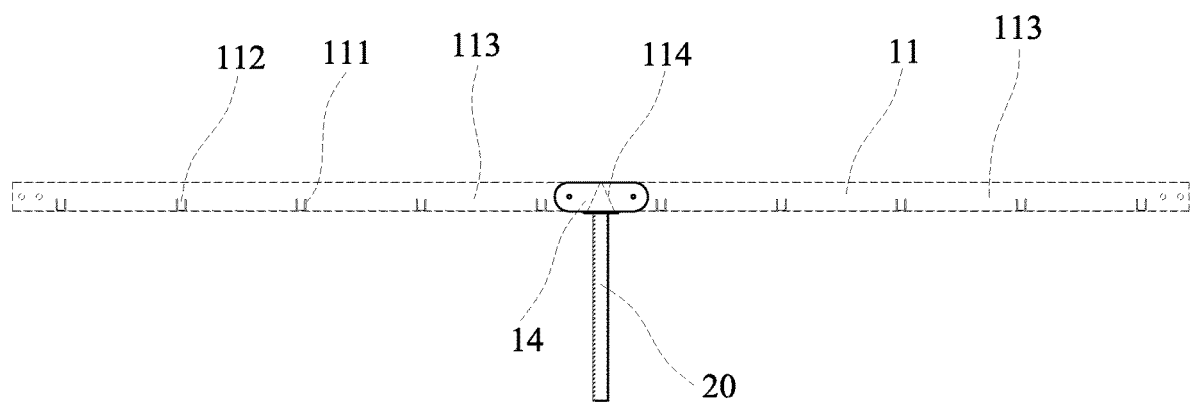
FIG. 3 is a schematic view of the side board in an unfolded state of the present invention.
Figure 4:
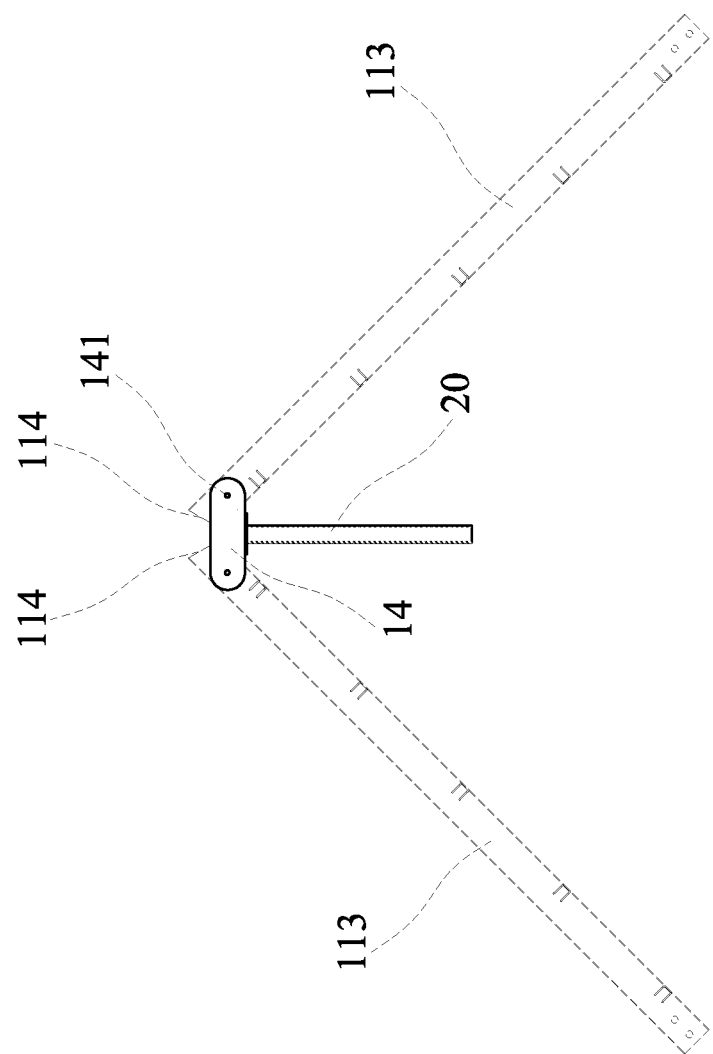
FIG. 4 is a schematic view of the side board in a semi-folded state of the present invention.
Figure 5:
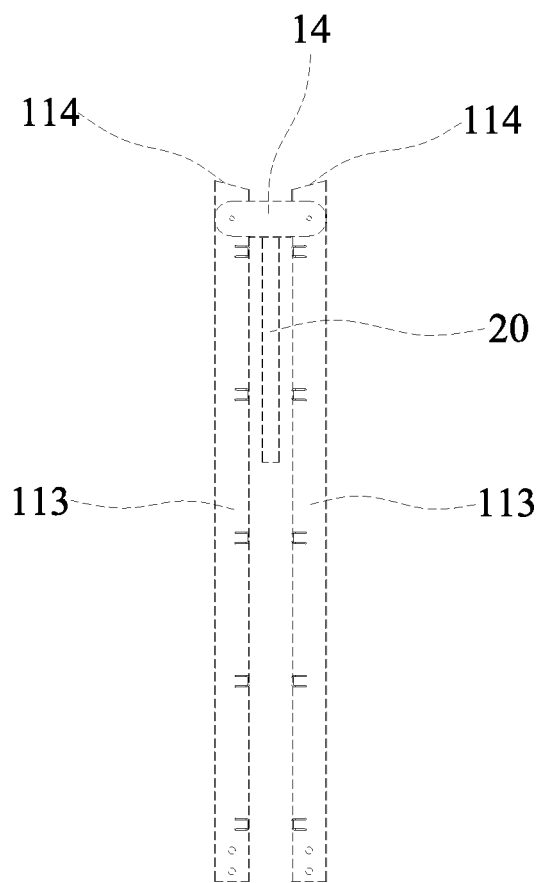
FIG. 5 is a schematic view of the side board in a fully-folded state of the present invention.

As shown in FIG. 1, the present invention discloses a bed frame. The bed frame comprises a frame 10, bed legs 20, and a bed plank support frame 30. The bed legs 20 are disposed at the bottom of the frame 10. The frame 10 includes two side boards 11, a head board 12 and a tail board 13 to form a rectangular frame. The bottoms of opposing sides of the two side boards 11 are provided with a plurality of U-shaped connecting members 111, respectively. The U-shaped connecting members 111 are welded to the side boards 11. The bed plank support frame 30 includes a plurality of support members 31. Two ends of each support member 31 are connected to U-shaped connecting grooves 112 of the corresponding U-shaped connecting members 111 of the two side board 11, respectively. Referring to FIG. 3 to FIG. 5, in order to improve the supporting strength of the bed frame and to facilitate the transportation and packaging of the bed frame, in an embodiment, each of the side boards 11, the head board 12 and the tail board 13 includes two short boards connected together by means of a coupling member 14. The side board 11 is taken as an example for detailed explanations. The two short boards 113 of the side board 11 are pivotally connected together by the coupling member 14. Two sides of the coupling member 14 have pivot holes 141 for connecting with the two short boards 113. The two short boards 113 pivotally connected with the coupling member 14 are rotatable or foldable. In the present invention, in order to prevent the situation that the two short boards 113 connected to the coupling member 14 have a gap therebetween when they are unfolded and in order to ensure that the two short boards 113 don't collide with each other when they are folded downward, an upper end of at least one of the short boards 113 is formed with a cut-out corner 114, which is inclined downward so that the upper ends of the short boards 113 connected to the coupling member 14 abut against each other when unfolded. As shown in FIG. 3 to FIG. 5, each of the two short boards 113 is formed with the cut-out corner 114. As shown in FIG. 3, when the two short boards 113 are unfolded, the upper ends of the two short boards 113 abut against each other, and the two cut-out corners 114 of the two short boards 113 have a triangular cross section as a retraction space. When the bed frame is unfolded for use, the upper ends of the two short boards 113 connected to the coupling member 14 are unfolded with their upper ends to abut against each other so that the upper surfaces of the two short boards 113 is flat, without a gap. Through the two short boards 113 abutting against each other, the middle of the bed frame is flatter and has a stable support. When the bed frame is folded, the short boards 113 connected to the coupling member 14 are folded down, respectively. Because the connecting end of each short board 113 is formed with the cut-out corner 114 to form a recess, the lower edges of the upper ends of the short boards 113 will not collide with each other so that the two short boards 113 can be smoothly folded downward, as shown in FIG. 4 and FIG. 5.

As shown in FIG. 1, in cooperation with FIG. 6 and FIG. 7, the bed plank support frame 30 includes the plurality of support members 31 and a support spine 32. Two ends of the support spine 32 are connected to middle portions (i.e., the coupling member 14 of the head board 12 and the coupling member 14 of the tail board 13 of this embodiment) of the head board 12 and the tail board 13, respectively. The support spine 32 may consist of two short boards connected by a coupling member. Two sides of the support spine 32 are provided with a plurality of connecting members 322 each having a slot 321, respectively. The connecting members 322 correspond in position to the U-shaped connecting members 111 of the two side boards 11, respectively. Each of the support members 31 includes two short struts 311. One end of each short strut 311 is connected to the U-shaped groove 112 of a corresponding one of the U-shaped connecting members 111 of the side boards 12, and another end of each short strut 311 is inserted in the slot 321 of a corresponding one of the connecting members 322 of the support spine 32.

Figure 8:
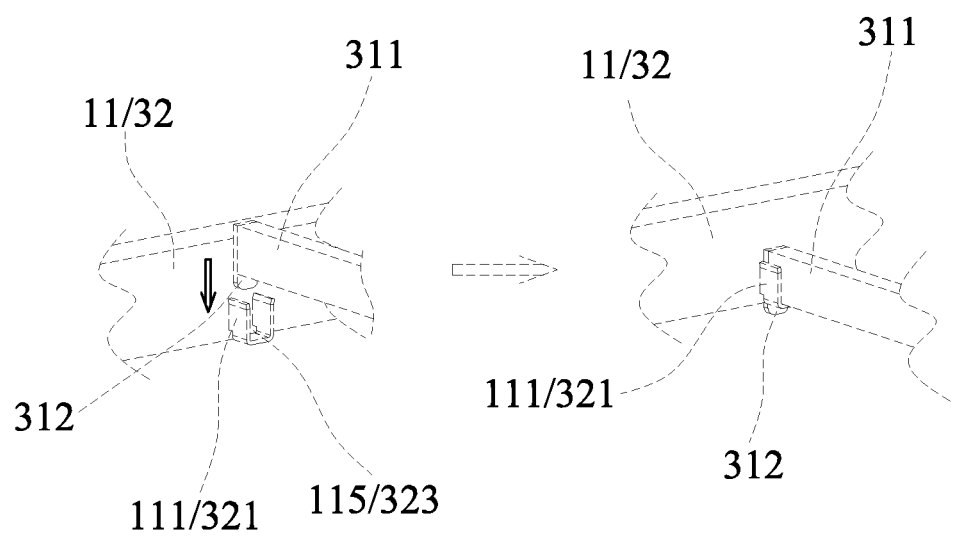
FIG. 8 is a schematic view showing the operation of the present invention.

Further, as shown in FIG. 8, in order to make the support members 31 more securely positioned and supported in the U-shaped grooves 112, each short strut 311 of the support member 31 forms a better fit with the corresponding U-shaped connecting member 111 and the slot 321. Two ends of each short strut 311 each extend downward to form a positioning piece 312. The inner sides of the respective bottoms of the U-shaped connecting members 111 and the connecting members 322, attached to the side boards 11 and the support spine 32, are each formed with a recess 115, 323 for the positioning piece 312 to be inserted and positioned. Alternatively, each of the two ends of each short strut 311 is provided with a connecting block. A lower end of the connecting block is longer than the short strut 311 to form the positioning piece 312. The positioning piece 312 is inserted in the recess 115, 323 to be positioned. When the bed frame is unfolded for use, the support members 31 are mounted between the side boards 11 of the bed frame. The two ends of each short strut 311 are inserted into the corresponding U-shaped groove 112 and the slot 321, respectively. The positioning piece 312 at the end of each short strut 311 is inserted in the corresponding recess 115, 323. The positioning piece 312 is restricted in the recess 115, 323, so that the movement of the short strut 311 is effectively restricted. The short strut 311 is securely positioned in the U-shaped groove 112 and the slot 321 so that the bed plank support frame 30 is less likely to be displaced or shaken.

To assemble the bed frame of the present invention, the two side boards 11, the head board 12 and the tail board 13 are connected and fixed to form the frame 10. The bed legs 20 are mounted at the bottom of the frame 10. The support spine 32 is mounted to the middle portions of the head board 12 and the tail board 13. The two ends of each support member 31 are mounted to the U-shaped groove 112 of the corresponding U-shaped connecting member 111 at the bottom of the side board 11 and the slot 321 of the connecting member 322 of the support spine 32 to assemble the bed frame.

When in use, a bed plank is placed on the bed plank support frame 30 of the bed frame. Because the U-shaped connecting members 111 of the side board 11 are disposed at the bottom of the side board 11, there is a certain distance between the bed plank and the tops of the side boards, the head board and the tail board, so that the frame is to form four stop sides. The stop sides not only prevent the mattress on the bed frame from sliding but also protect children from falling out of the bed.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A bed frame, comprising a frame, bed legs and a bed plank support frame, the bed legs being disposed at a bottom of the frame, the frame including two side boards, a head board and a tail board to form a rectangular frame, wherein respective bottoms of opposing sides of the two side boards being provided with a plurality of U-shaped connecting members respectively, the bed plank support frame including a plurality of support members, two ends of each support member being connected to U-shaped connecting grooves of the corresponding U-shaped connecting members of the two side boards respectively;

wherein the U-shaped connecting members are welded to the side boards;

wherein the bed plank support frame includes the plurality of support members and a support spine, two ends of the support spine are connected to middle portions of the head board and the tail board respectively, two sides of the support spine are provided with a plurality of connecting members each having a slot respectively, the connecting members of the support spine correspond in position to the U-shaped connecting members of the two side boards respectively, each of the support members includes two short struts, one end of each short strut is connected to the U-shaped groove of a corresponding one of the U-shaped connecting members of the side boards, and another end of each short strut is inserted in the slot of a corresponding one of the connecting members of the support spine;

wherein each of the side boards, the head board and the tail board includes two short boards connected together by means of a coupling member;

wherein ends of the two short boards are connected to the coupling member such that the ends of the two short boards abut against each other when the two short boards are set in an unfolded condition, wherein the end of at least one of the two short boards is formed with a cut-out corner, which is defined by a slope that is inclined inward as being extended downward from an upper side of the at least one short board toward an opposite lower side, the cut-out corner defining a void space that diverges in a direction from the upper side of the at least one short board toward the lower side of the at least one short board;

wherein the upper sides of the ends of the two short boards abut against each other in the unfolded condition, and each of the two short boards is formed with the cut-out corner, such that the two cut-out corners of the two short boards define therebetween a void space having a triangular cross section.

2. The bed frame as claimed in claim 1, wherein the two ends of each short strut each extend downward to form a positioning piece, and inner sides of respective bottoms of the U-shaped connecting members and the connecting members, attached to the side boards and the support spine, are each formed with a recess for the positioning piece to be inserted and positioned.

3. The bed frame as claimed in claim 2, wherein each of the two ends of each short strut is provided with a connecting block, a lower end of the connecting block is longer than the short strut to form the positioning piece, and the positioning piece is inserted in the recess to be positioned.

\* \* \* \* \*